US011935492B2

(12) United States Patent
Pytlarz

(10) Patent No.: US 11,935,492 B2
(45) Date of Patent: Mar. 19, 2024

(54) IMAGE-DEPENDENT CONTRAST AND BRIGHTNESS CONTROL FOR HDR DISPLAYS

(71) Applicant: Dolby Laboratories Licensing Corporation, San Francisco, CA (US)

(72) Inventor: Jaclyn Anne Pytlarz, Santa Clara, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/920,115

(22) PCT Filed: Apr. 27, 2021

(86) PCT No.: PCT/US2021/029476
§ 371 (c)(1),
(2) Date: Oct. 20, 2022

(87) PCT Pub. No.: WO2021/222310
PCT Pub. Date: Nov. 4, 2021

(65) Prior Publication Data

US 2023/0169930 A1 Jun. 1, 2023

Related U.S. Application Data

(60) Provisional application No. 63/016,363, filed on Apr. 28, 2020.

(30) Foreign Application Priority Data

Apr. 28, 2020 (EP) .................................... 20171788

(51) Int. Cl.
*G09G 3/34* (2006.01)

(52) U.S. Cl.
CPC ... *G09G 3/3406* (2013.01); *G09G 2320/0238* (2013.01); *G09G 2320/0626* (2013.01);
(Continued)

(58) Field of Classification Search
CPC ......... G09G 3/3406; G09G 2320/0238; G09G 2320/0626; G09G 2320/0646; G09G 2320/066; G09G 2360/16
See application file for complete search history.

(56) References Cited

U.S. PATENT DOCUMENTS 7,023,406 B1 4/2006 Nunomura
7,093,941 B2 8/2006 Kawashima
(Continued)

FOREIGN PATENT DOCUMENTS

JP 2007219631 A 8/2007
WO 2016118395 A1 7/2016
(Continued)

*Primary Examiner* — Antonio Xavier

(57) ABSTRACT

Methods and systems to adjust differently brightness and contrast for dark and bright pictures on a display are provided. Given a tone-mapping curve mapping an input dynamic range to a display comprising a minimum and maximum display luminance value, the maximum display luminance value is lowered to an adjusted luminance value according to user defined parameters. The input dynamic range is tone-mapped to the display dynamic range using the adjusted luminance value. For brightness control, the tone mapped image is stretched linearly back to the maximum display luminance value. For contrast control, a gamma or power EOTF of the display is adjusted according to the adjusted luminance. For displays with global backlight control, the global backlight is adjusted only when contrast is adjusted.

11 Claims, 7 Drawing Sheets

(52) U.S. Cl.
CPC ............... *G09G 2320/0646* (2013.01); *G09G 2320/066* (2013.01); *G09G 2360/16* (2013.01)

(56) References Cited

U.S. PATENT DOCUMENTS

| | | | | |
|---|---|---|---|---|
| 8,120,570 | B2 | 2/2012 | Kerofsky | |
| 9,300,900 | B2 | 3/2016 | Allen | |
| 9,613,407 | B2 | 4/2017 | Atkins | |
| 10,007,412 | B2 | 6/2018 | Tao | |
| 10,275,865 | B2 | 4/2019 | Nam | |
| 10,403,214 | B2 | 9/2019 | Baar | |
| 10,404,957 | B2 | 9/2019 | Damberg | |
| 10,600,166 | B2 | 3/2020 | Pytlarz | |
| 2004/0201561 | A1 | 10/2004 | Funamoto | |
| 2009/0267876 | A1 | 10/2009 | Kerofsky | |
| 2017/0116963 | A1 | 4/2017 | Wanat | |
| 2017/0124983 | A1* | 5/2017 | Atkins | G09G 5/06 |
| 2018/0018932 | A1* | 1/2018 | Atkins | G09G 5/005 |
| 2019/0304379 | A1* | 10/2019 | Pytlarz | G09G 3/3406 |
| 2020/0082761 | A1 | 3/2020 | Kim | |

FOREIGN PATENT DOCUMENTS

| | | | |
|---|---|---|---|
| WO | 2018152063 | A1 | 8/2018 |
| WO | 2019170465 | A1 | 9/2019 |

* cited by examiner

IMAGE-DEPENDENT CONTRAST AND BRIGHTNESS CONTROL FOR HDR DISPLAYS

CROSS-REFERENCE TO RELATED APPLICATIONS

This application claims the benefit of priority from U.S. Provisional Application No. 63/016,363, filed on 28 Apr. 2020, and European Patent Application No. 20171788.1, filed on 28 Apr. 2020, which are hereby incorporated by reference.

TECHNOLOGY

The present document relates generally to images and display management. More particularly, an embodiment of the present invention relates to image-dependent contrast and brightness control for displaying high dynamic range images (HDR) images on color displays.

BACKGROUND

Almost every television set and display monitor provides a user interface to adjust "brightness" and "contrast." The contrast adjustment allows a user to manage white details. The higher the contrast setting, the brightest the white part of an image will be. If contrast is too high, then one may actually lose details in the white parts of an image.

The brightness adjustment allows a user to manage black details. The lower the brightness setting, the darker the black part of an image will be. If brightness is too low, then one may actually lose details in the black parts of an image.

These settings apply equally to all images regardless of their luminance characteristics. This may work well for images and displays with standard dynamic range; however, as appreciated by the inventors, such fixed settings may not be adequate for high dynamic range (HDR) images and displays. Thus, adjustable (e.g., user-defined), image-dependent, brightness and contrast controls for displays are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
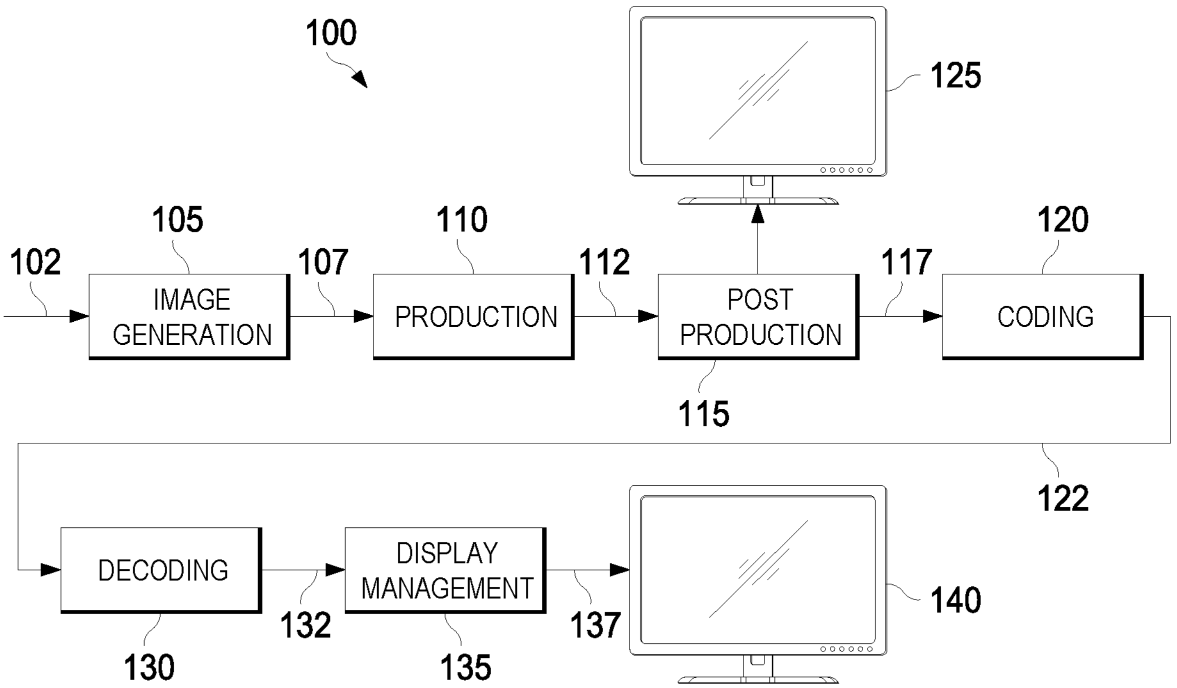
(PRIOR ART) FIG. 1
FIG. 1 depicts an example process for a video delivery pipeline.

Example embodiments for image-dependent brightness and contrast control for HDR displays are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

SUMMARY

Example embodiments described herein relate to image-dependent brightness and contrast control for HDR displays. In an embodiment, a system with a processor receives an input image in an image dynamic range;

receives a minimum display luminance value and a maximum display luminance value defining a display dynamic range of a target display;

generates (405) an adjusted maximum luminance value for the target display based on an average picture level boost adjustment parameter, wherein the adjusted maximum luminance value is lower than the maximum display luminance value;

generates (410) a tone-mapped image with a tone-mapping function and the input image, wherein the tone-mapping function maps the image dynamic range to the minimum display luminance value and the adjusted maximum luminance value; and generates (415) an output image for the target display by applying a linear mapping to the tone-mapped image, wherein parameters of the linear mapping are based on the minimum display luminance value, the maximum display luminance value, and the adjusted maximum luminance value.

In a second embodiment, a system with a processor receives an input image in an image dynamic range;

receives a minimum display luminance value and a maximum display luminance value defining a display dynamic range of a target display;

generates (420) a first adjusted luminance value for the target display based on a peak luminance adjustment parameter, wherein the first adjusted luminance value is lower than the maximum display luminance value;

generates (430) a tone-mapped image with a tone-mapping function and the input image, wherein the tone-mapping function maps the image dynamic range to the minimum display luminance value and the first adjusted luminance value; and generates (435) an output image for the target display based on the tone-mapped image.

In a third embodiment, a system with a processor receives an input image in an image dynamic range;

receives a minimum display luminance value and a maximum display luminance value defining a display dynamic range of a target display;

generates a first adjusted luminance value for the target display based on a peak luminance adjustment parameter and the maximum display luminance value, wherein the first adjusted luminance value is lower than the maximum display luminance value;

generates a second adjusted luminance value for the target display based on an average picture level boost adjustment parameter and the first adjusted luminance value;

generates (455) a tone-mapped image with a tone-mapping function and the input image, wherein the tone-mapping function maps the image dynamic range to the minimum display luminance value and the second adjusted luminance value;

generates (460) an output image for the target display by applying a linear mapping to the tone-mapped image, wherein parameters of the linear mapping are based on the minimum display luminance value, the first adjusted display luminance value, and the second adjusted luminance value; and generates (465) a display output image for the target display based on the output image.

Example Video Delivery Processing Pipeline

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, judder or blur control, frame rate control, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Image-Dependent Display Controls

Traditional brightness and contrast controls on television sets do not take into consideration the luminance content of the images. For example, if one decreases contrast to accommodate images with large highlights, then darker images may lose detail. As appreciated by the inventors, it would be desirable to allow users to adjust the display brightness and contrast based on image characteristics. For example, bright images should not be made brighter and dark images should not be made darker. Alternatively, depending on the preferred adjustment, given a bright and a dark image, only one of them should change according to user preferences. To address this issue, in an embodiment, two new, image-dependent, display controls are proposed: dynamic average picture level (APL) boost, to enhance darks without affecting the highlights, and dynamic peak luminance reduction, to adjust the highlights without affecting the darks. The two controls may also be combined together.

APL Boost

Figure 2A:
FIG. 2A depicts an example of applying average picture level (APL) boost according to an embodiment of this invention.

The intent of dynamic average picture level (APL) boost is to increase the apparent brightness of the images without losing important details. Traditional brightness adjustments apply a brightness boost to all content. An embodiment provides an adaptive solution that gives more boost to dark images (improving details in the darks) and less boost to bright images (maintaining details in the highlights). An example of this effect is illustrated in the images depicted in FIG. 2A. In FIG. 2A, the leftmost two pictures are the originals; a bright one on the top and a darker one in the bottom. Applying APL boost according to an embodiment, as depicted on the right side of FIG. 2A, allows for more details on the lower, dark, image, without compromising the dark details or the highlights in the top image. In an embodiment, dynamic APL boost is performed by the appropriate management of the parameters during the display management process. As used herein, the terms "display management" or "display mapping" denote the processing (e.g., tone and gamut mapping) required to map images or pictures of an input video signal of a first dynamic range (e.g., 0.01 to 1,000 nits) to a display of a second dynamic range (e.g., 0.05 to 800 nits) The second dynamic range can be lower or higher than the first dynamic range. Examples of display management processes can be found in U.S. Pat. No. 9,613,407, "Display management for high dynamic range images," by R. Atkins et al., which is incorporated herein by reference in its entirety.

Figure 3:
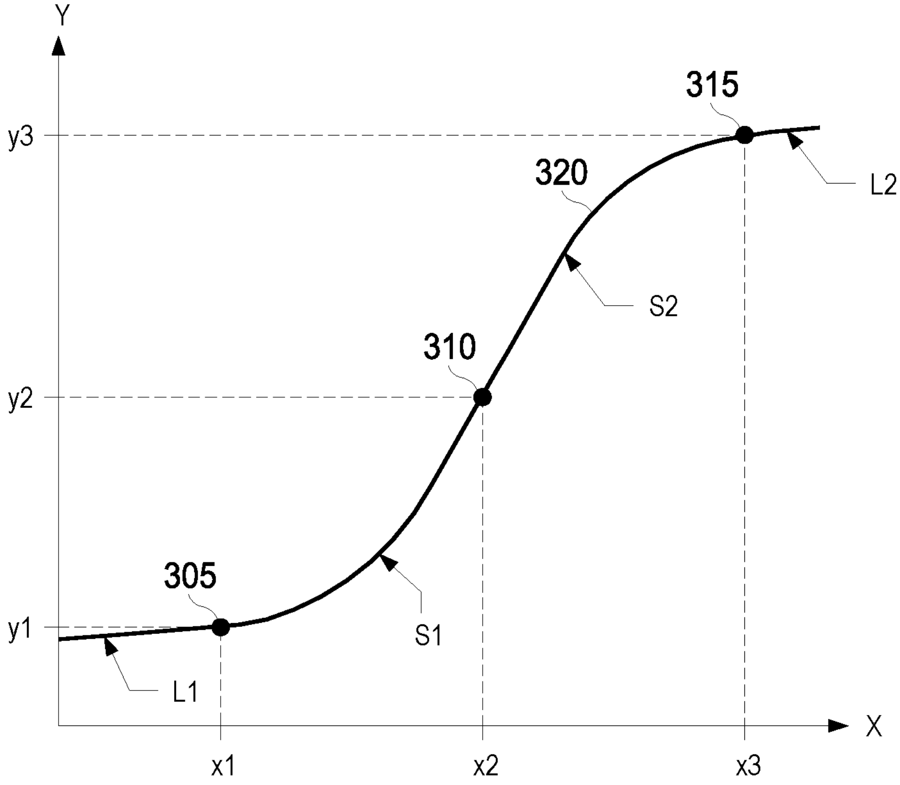
FIG. 3 (PRIOR ART)
FIG. 3 depicts an example tone-mapping curve for display management according to prior art.

As described in U.S. Pat. No. 10,600,166 (to be referred to as the '166 patent), "Tone curve mapping for high dynamic range images," by J. A. Pytlarz and R. Atkins, which is incorporated herein by reference, in many display applications, source data in a first dynamic range may be mapped to a display with a different dynamic range using a tone mapping curve. For example, image data with luminance values within [Smin, Smax] may be tone-mapped to a display with a dynamic range [Tmin, Tmax], wherein Tmin and Tmax denote the lowest black and maximum white values that can be displayed (e.g., in nits). An example of such a tone-mapping curve, controlled by three anchor points is depicted in FIG. 3.

Tone-mapping curve (320) is controlled by three anchor points (305, 310, 315): a black point (x1, y1), a mid-tones value point (x2, y2), and a white point (x3, y3). In addition, each of the spline segments (S1 and S2) can be further constrained by two linear segments (L1 and L2), at each end-point; thus the full curve is controlled by three anchor points and three slopes: the tail slope of segment L1 at (x1,y1), the mid-tones slope at (x2,y2), and the head slope of segment L2 at (x3,y3).

As described in the '166 patent, the complete tone-mapping curve may be defined based on the following parameters:

Smin=x1; denotes the minimum luminance of the source content. If not given, Smin may be set to a value representing typical blacks (e.g., Smin=0.0151)

Smax=x3; denotes the maximum luminance of the source content. If not given, Smax may be set to a large value representing "highlights" (e.g., Smax=0.9026)

Smid=x2; denotes the average (e.g., arithmetic, median, geometric) luminance of the source content. In some embodiments, it may simply denote an "important" luminance feature in the input picture. In some other embodiment it may also denote the average or median of a selected region (say, a face). Smid may be defined manually or automatically and its value may be offset based on preferences to retain a certain look in highlights or shadows. If not given, Smid may be set to a typical average value (e.g., Smid=0.36, representing skin tones).

These data may be received using image or source metadata, they may be computed by a display management unit (e.g., 135), or they may be based on known assumptions about the mastering or reference display environment. In addition, the following data are assumed to be known for the target display (e.g., received by reading the display's Extended Display Identification Data (EDID)):

Tmin=the minimum luminance of the target display

Tmax=the maximum luminance of the target display

To fully determine the mapping curve, the following points and parameters need to be computed:

$Tmin_{Adj}$=y1;
$Tmax_{Adj}$=y3;
$Tmid_{Adj}$=y2;
slopeMin=slope at (x1,y1);
slopeMid=slope at (x2,y2); and
slopeMax=slope at (x3, y3).

Without limitation, an example process for defining these parameters is described in the '166 patent.

Figure 4A:
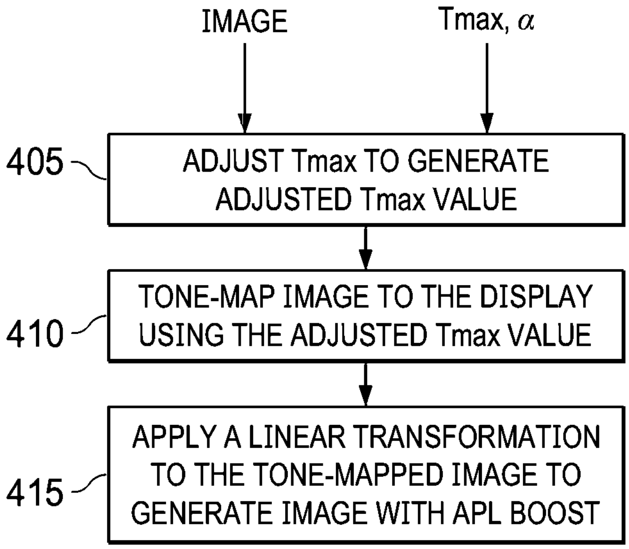
FIG. 4A depicts an example process for applying APL boost according to an embodiment of this invention.

Consider now an embodiment where, given Tmax and Tmin as defined above, let α denote an average picture level (APL) boost adjustment parameter (e.g., α∈[0,1], where 0=no adjustment, 1=full APL boost). Then, FIG. 4A, depicts an example process for applying a dynamic APL boost according to an embodiment. As depicted in FIG. 4A, in step 405, given an input image, the user-defined average picture level (APL) boost adjustment parameter a, and other characteristics of the input signal and the target display (e.g., Tmax), the value of the input Tmax value is adjusted to derive an adjusted Tmax value $$Tmax_{Adj} = Tmax * \frac{1}{2^{\alpha}}. \tag{1}$$

Next, in step 410, a display management process tone-maps the input image using the $Tmax_{Adj}$ value.

Adjusting the Tmax value used in the dynamic tone mapping algorithm affects images as follows: bright images will generally be made much darker whereas dark images will stay roughly the same. Thus, one has effectively increased the relative brightness of dark images compared to their bright counterparts.

In an embodiment, display (140) may support backlight control via global or local dimming Backlight dimming control allows a TV to adjust the intensity of its backlight to enhance image content depending on image characteristics or the ambient light in the viewing environment. An example of determining backlight dimming is given in U.S. Patent Application Publication US 2019/0304379, "Ambient light-adaptive display management," by J. A. Pytlarz et al., which is incorporated herein by reference.

Under dynamic APL boost, it is preferable that computing the adjusted Tmax value does not affect how global dimming is set up. For example, if the desired Tmax calculated during the global dimming calculations is chosen to be 600 cd/m$^2$ and the average picture level (APL) boost adjustment parameter a value is 1, the backlight should still be set to 600 cd/m$^2$ but the $Tmax_{Adj}$ used for mapping should be set to Tmax/2=300 cd/m$^2$.

After tone mapping (410), in step 415, after the input image has been converted to its target color space (e.g., RGB), a linear mapping, as described below, completes the dynamic APL boost. Since the adjusted Tmax value is lower than the original one, in this step, the content, in linear space, is stretched back to the original Tmax of the display. This means that bright images that have been made darker will remain roughly at the same luminance as if no APL boost was applied, whereas dark images that have not changed will be made brighter. This will raise the adjusted Tmax value back to the original Tmax, while keeping Tmin the same. Thus, given a slope m and an offset b, $$m = \frac{Tmax - Tmin}{Tmax_{Adj} - Tmin}, \tag{2}$$

$$b = \frac{Tmin * Tmax - Tmin^2}{Tmax_{Adj} - Tmin} - Tmin,$$

then, $$RGB = RGB * m - b, \tag{3}$$

where RGB denotes a color component of the tone-mapped image (e.g., R, G, or B, and the like). These linear RGB values may be further processed by an electro-optical transfer function (EOTF) of the target display, (e.g., gamma, PQ, and the like), to generate the final image to be displayed with APL boost.

In another embodiment this linear mapping could also be applied directly during the tone-mapping process, but only on the intensity color (e.g., on the I component of an ICtCp image); however, the end result may be slightly different.

Dynamic Peak Luminance Adjustment

Figure 2B:
FIG. 2B depicts an example of applying peak luminance adjustment according to an embodiment of this invention.

The intent of the peak-luminance adjustment is to reduce the brightness of images, specifically targeting the highlights. Traditional brightness reduction algorithms darken all images equally, resulting in loss of detail in dark images when trying to compensate for bright images. In an embodiment, a method is proposed for reducing the peak luminance during the tone mapping step which will dynamically adjust the tone-mapping process. As depicted in FIG. 2B, given the same original images as in FIG. 2A (e.g., the two leftmost images), this method allows bright images (e.g., the top left image) to be adjusted more than dark images. (e.g., the bottom left image). One advantage of this method is that dark-image detail will remain visible when compensating for images that are too bright. An example of the peak luminance adjustment (PLA) process is depicted in FIG. 4B.

Figure 4B:
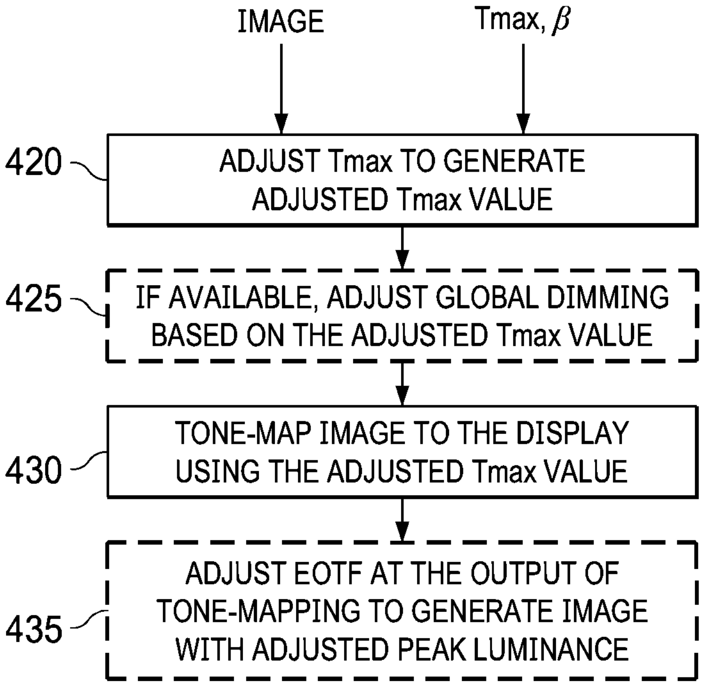
FIG. 4B depicts an example process for applying peak luminance adjustment according to an embodiment of this invention.

As depicted in FIG. 4B, in step 420, given the characteristics of the input image and the target display (e.g., Tmax), and β, a peak luminance adjustment parameter (e.g., β∈[0, 1]), the input Tmax value is adjusted to derive an adjusted Tmax value $$Tmax_{Adj} = Tmax * \frac{1}{2^{\beta}}. \tag{4}$$

Unlike the APL boost process, after peak luminance adjustment, the tone-mapped image is not going to be stretched, so reducing the backlight may improve image quality and lower power consumption. In this case, the backlight may be lowered to match the $Tmax_{Adj}$ value. The Tmin value during mapping may also need to be adjusted based on the backlight reduction as well, depending on the characteristics of the global dimming display. This step is completed in step 425. Next, as in FIG. 4A, in step 430, a display management process tone-maps the input image using the Tmin and $Tmax_{Adj}$ values. Note: the Tmin value may be replaced by $Tmin_{Adj}$ if it has been adjusted due to the global dimming adjustment.

In an embodiment, the EOTF conversion on the output of the tone mapping (if using a gamma or power EOTF) will also need to be adjusted. If the display is using global dimming and has a power or gamma output, in the normalization step 435, input values to the EOTF function (e.g., RGB values of the tone-mapped output) are normalized based on the adjusted dynamic range (e.g. Tmax-Tmin or $Tmax_{Adj}$–$Tmin_{Adj}$). If the display is not a global dimming display, then the original Tmax and Tmin should be used for normalization. By way of example, for a non-global dimming display:

$$RGB' = \frac{RGB}{Tmax - Tmin}^{1/\gamma}, \tag{5}$$

whereas, for a global dimming display where the backlight has been adjusted:

$$RGB' = \frac{RGB}{Tmax_{Adj} - Tmin_{Adj}}^{1/\gamma}, \tag{6}$$

where RGB' denotes a color component of the output display image given an RGB input value to the EOTF function, γ denotes the gamma or power EOTF factor of the target display, and $Tmin_{Adj}$ denotes the adjusted Tmin value being used by global dimming Similar normalization may be applied to other gamma- or power-like EOTF functions.

Note that if the display is using a PQ EOTF, the EOTF normalization step is not required because it is an absolute color representation (the range [0, 10,000] cd/$m^2$ is always transmitted).

As an example, Tmin may be adjusted based on the contrast ratio (ContrastRatio) of the display. For example, the adjusted Tmin may be computed from Tmax, $Tmax_{Adj}$, and Tmin as follows:

$$ContrastRatio = \frac{Tmax}{Tmin}, \tag{7}$$

-continued $$Tmin_{Adj} = \frac{Tmax_{Adj}}{ContrastRatio}.$$

Figure 2C:
FIG. 2C depicts example images without APL boost or peak luminance adjustment.
Figure 2D:
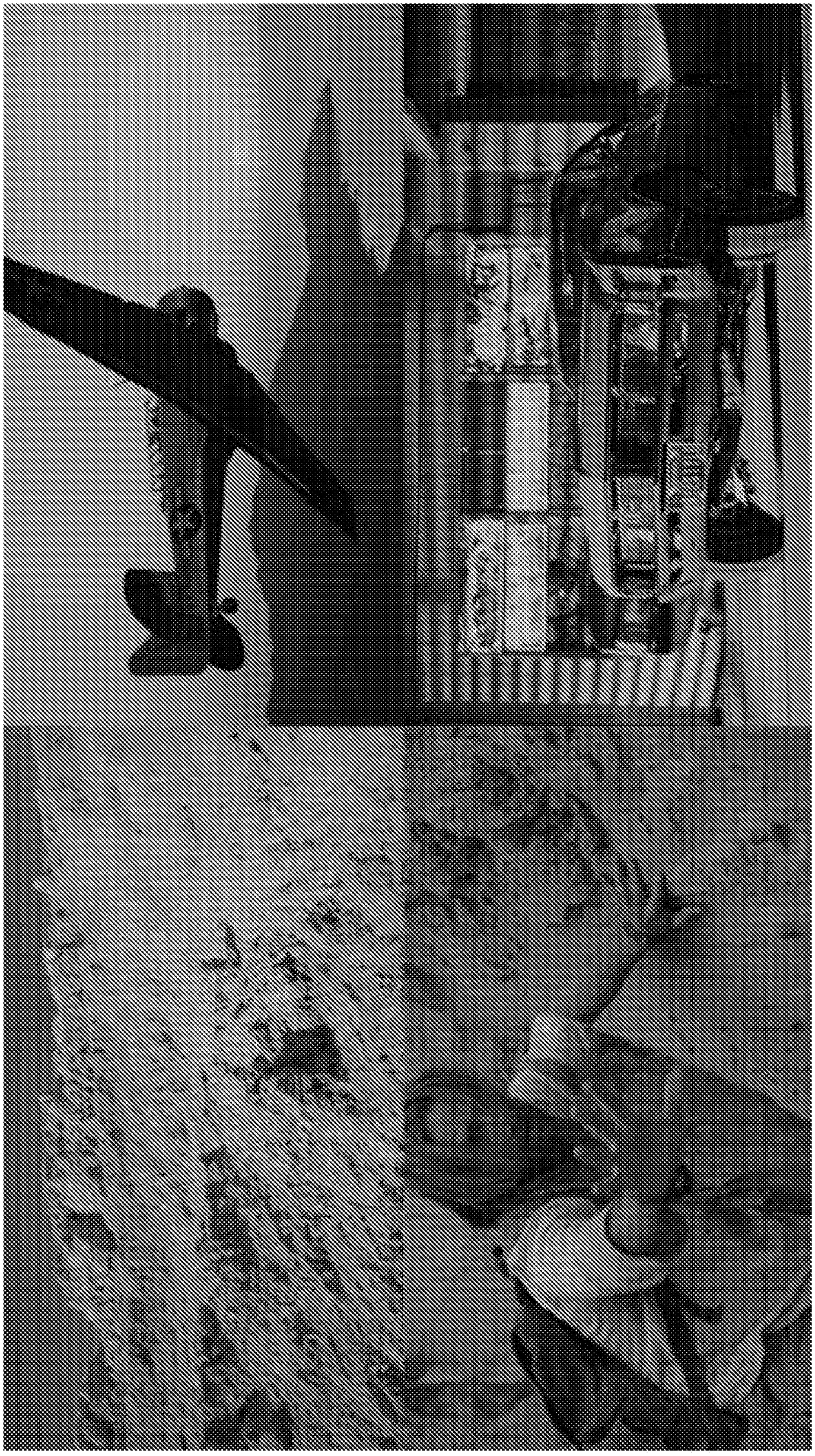
FIG. 2D depicts the example images of FIG. 2C after being processed with both APL boost and peak luminance adjustment according to an embodiment of this invention.

In an embodiment, it is possible to apply both an APL boost and peak luminance adjustment (PLA). This may be desired for improved eye comfort in situations such as night-time viewing or for user preference towards a steady luminance presentation. An example is depicted in the pictures shown in FIG. 2C (originals) and FIG. 2D (processed with both APL boosting and peak luminance adjustment). For example, as depicted in FIG. 2D, the left bottom image shows more details in the blacks and the top left image is overall dimmer. In the top right image, the adjustment affects mostly the brightness of the sun (which now appears dimmer), and in the bottom right image, the dark car looks brighter while the bright, white panels behind it appear dimmer.

Figure 4C:
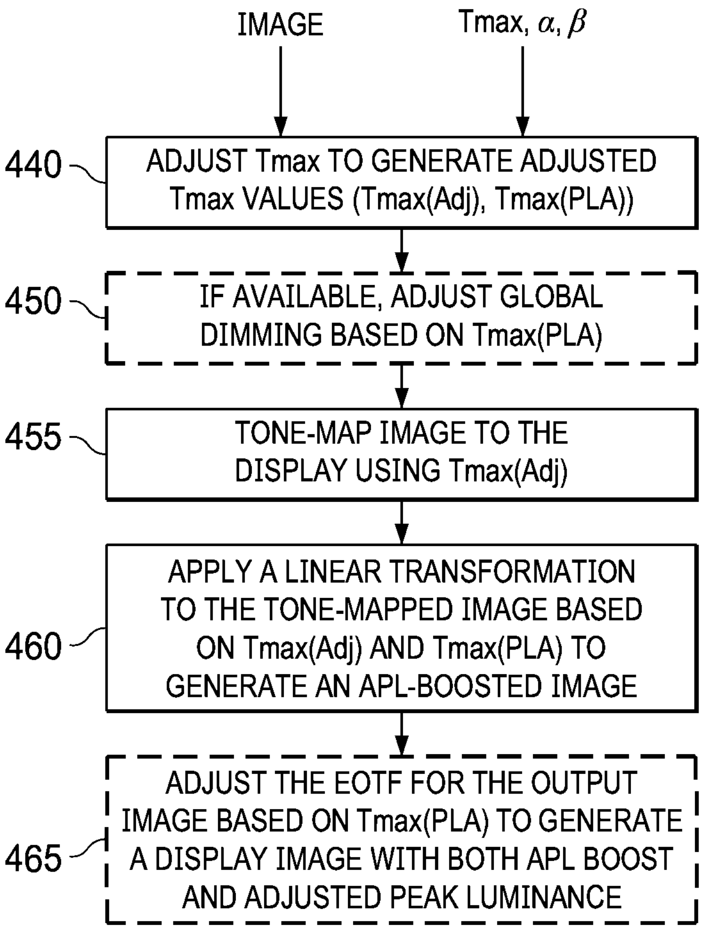
FIG. 4C depicts an example process for applying both APL boost and peak luminance adjustment according to an embodiment of this invention.

FIG. 4C depicts an example process flow where a display implements both APL boost and peak luminance adjustment. Under this scenario, in step 440, adjusted Tmax values are computed as $$Tmax_{Adj} = Tmax * \frac{1}{2^{\alpha}} * \frac{1}{2^{\beta}}. \tag{8}$$

$$Tmax_{PLA} = Tmax * \frac{1}{2^{\beta}}.$$

The global dimming adjustments (450) and the tone-mapping step (455) remain the same as before except that tone mapping in step 455 needs to take into consideration any adjustments due to either global dimming or the PLA process. That is, the tone mapping of the input image dynamic range will be mapped to [Tmin, $Tmax_{Adj}$] if Tmin is not adjusted due to global dimming or [$Tmin_{PLA}$, $Tmax_{Adj}$] if it does. Similarly, for APL boost, in step 460, the linear mapping is based on $Tmax_{PLA}$, $Tmax_{Adj}$, and any adjustments of Tmin during optional global dimming adjustments (e.g., in some embodiments $Tmin_{PLA}$=Tmin).

$$m = \frac{Tmax_{PLA} - Tmin_{PLA}}{Tmax_{Adj} - Tmin_{PLA}}, \tag{9}$$

$$b = \frac{Tmin_{PLA} * Tmax_{PLA} - Tmin_{PLA}^2}{Tmax_{Adj} - Tmin_{PLA}} - Tmin_{PLA},$$

$$RGB_o = RGB * m - b.$$

Finally, in step 465, any EOTF adjustments are based only on $Tmax_{PLA}$=Tmax*1/$2^{\beta}$. Thus, as an example, for a display with a gamma EOTF, without global dimming:

$$RGB' = \frac{RGB}{Tmax - Tmin}^{1/\gamma}, \tag{10}$$

whereas, for a similar display where the backlight has been adjusted:

$$RGB' = \frac{RGB}{Tmax_{PLA} - Tmin_{PLA}}^{1/\gamma}, \tag{11}$$

The equations above may be explained better with the following example. Assume the target display has Tmax=300 nits. Let β=1, then $Tmax_{PLA}$=150 nits. The whole display is now treated as being a 150 nits display, and any tone-mapping needs to be constrained to never exceed 150 nits. In a display with global dimming, one has also the opportunity to lower Tmin to $Tmin_{Adj}$ (by lowering the backlight until the peak is 150 nits), e.g., from equation (7), $Tmin_{PLA}$=150/ContrastRatio. When applying APL boost, all image processing keeps the physical Tmin and Tmax of the display constant, but now, given the PLA adjustment, Tmax and Tmin in equations (2) and (3) will actually be $Tmax_{PLA}$ (150 nits) and $Tmin_{PLA}$ (if adjusted).

The value of α typically ranges in [0,1], but some embodiments may allow for even higher values (e.g., up to 3). Values of β may also run from [0,1], but β is more often kept closer to the lower values, except in a very dark environment.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to image-dependent brightness and contrast adjustments, such as those described herein. The computer and/or IC may compute any of a variety of parameters or values that relate to image-dependent brightness and contrast adjustments described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to image-dependent brightness and contrast adjustments as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to image-dependent brightness and contrast adjustments are thus described. In the foregoing specification, embodiments of the present invention have been described with reference to numerous specific details that may vary from implementation to implementation. Thus, the sole and exclusive indicator of what is the invention and what is intended by the applicants to be the invention is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method for providing an image-dependent brightness control based on a user-defined value of a peak luminance adjustment parameter to reduce brightness in bright image portions relatively stronger than in dark image portions, the method comprising:

receiving an input image in an image dynamic range;

receiving a minimum display luminance value and a maximum display luminance value defining a display dynamic range of a target display;

generating (420) a first adjusted luminance value for the target display based on the peak luminance adjustment parameter and the maximum display luminance value, wherein the first adjusted luminance value is lower than the maximum display luminance value;

generating (430) a tone-mapped image with a tone-mapping function and the input image, wherein the tone-mapping function maps the image dynamic range to the minimum display luminance value and the first adjusted luminance value; and generating (415) an output image for the target display based on the tone-mapped image; wherein generating the first adjusted luminance value ($Tmax_{Adj1}$) comprises computing $$Tmax_{Adj1} = Tmax * \frac{1}{2^{\beta}},$$

wherein Tmax denotes the maximum display luminance value and β denotes the peak luminance adjustment parameter.

2. The method of claim 1, wherein the peak luminance adjustment parameter is between 0 and 1.

3. The method of claim 1, further comprising adjusting global backlight dimming for the target display based on the first adjusted luminance value, and the tone-mapping function maps the image dynamic range to an adjusted minimum display luminance value and the first adjusted luminance value.

4. The method of claim 1, wherein for a target display with a gamma or power electro-optical transfer function (EOTF), before applying the EOTF, an input to the EOTF is normalized by a delta factor comprising a difference of the minimum display luminance value from the maximum display luminance value when there is no backlight dimming adjustment or a difference of an adjusted minimum luminance value from the first adjusted luminance value when there is backlight dimming adjustment.

5. The method of claim 4, wherein given a color component (RGB) of the input to the EOTF image, generating a color component (RGB') of an EOTF output comprises computing:

$$RGB' = \frac{RGB}{T\max - T\min}^{1/\gamma}$$

if there is no global backlight dimming adjustment on the target display, and computing $$RGB' = \frac{RGB}{T\max_{Adj1} - T\min_{Adj}}^{1/\gamma}.$$

if there is global backlight dimming adjustment on the target display, wherein γ denotes the gamma or power factor, Tmin denotes the minimum display luminance value, Tmax denotes the maximum display luminance value, $\mathrm{Tmax}_{Adj1}$ denotes the first adjusted luminance value, and $\mathrm{Tmin}_{Adj}$ denotes the adjusted minimum luminance value due to the global backlight dimming adjustment.

6. The method of claim 1, wherein the method is further based on a user-defined value of an average picture level boost adjustment parameter to increase brightness in dark image portions relatively stronger than in bright image portions, the method further comprising:

generating (440) a second adjusted luminance value for the target display based on the average picture level boost adjustment parameter and the first adjusted luminance value, wherein the second adjusted luminance value is lower than the maximum display luminance value;

generating (455) the tone-mapped image with the tone-mapping function and the input image, wherein the tone-mapping function maps the image dynamic range to the minimum display luminance value and the second adjusted luminance value; and generating (460) a first output image for the target display by applying a linear mapping to the tone-mapped image, wherein parameters of the linear mapping are based on the minimum display luminance value, the first adjusted luminance value, and the second adjusted luminance value;

wherein generating the second adjusted luminance value ($\mathrm{Tmax}_{Adj2}$) comprises computing $$T\max_{Adj2} = T\max_{Adj1} * \frac{1}{2^{\alpha}},$$

wherein $\mathrm{Tmax}_{Adj1}$ denotes the first adjusted luminance value and α denotes the average picture level boost adjustment parameter.

7. The method of claim 6, wherein for an RGB color component in the tone-mapped image applying the linear mapping to generate a color component ($\mathrm{RGB}_o$) in the output image comprises computing $$\mathrm{RGB}_o = \mathrm{RGB} * m - b,$$

wherein, $$m = \frac{T\max_{Adj1} - T\min}{T\max_{Adj2} - T\min}$$

and $$b = \frac{T\min * T\max_{Adj1} - T\min^2}{T\max_{Adj2} - T\min} - T\min$$

denote the parameters of the linear mapping, Tmin denotes the minimum display luminance value, $\mathrm{Tmax}_{Adj1}$ denotes the first adjusted luminance value, and $\mathrm{Tmax}_{Adj2}$ denotes the second adjusted luminance value.

8. A non-transitory computer-readable storage medium having stored thereon computer-executable instructions for executing with one or more processors the method of claim 1.

9. An apparatus comprising a processor and configured to perform the method of claim 1.

10. A computer-implemented method for providing an image-dependent brightness control based on a user-defined value of an average picture level boost adjustment parameter to increase brightness in dark image portions relatively stronger than in bright image portions, the method comprising:

receiving an input image in an image dynamic range;

receiving a minimum display luminance value and a maximum display luminance value defining a display dynamic range of a target display;

generating (405) an adjusted maximum luminance value for the target display based on the average picture level boost adjustment parameter, wherein the adjusted maximum luminance value is lower than the maximum display luminance value;

generating (410) a tone-mapped image with a tone-mapping function and the input image, wherein the tone-mapping function maps the image dynamic range to the minimum display luminance value and the adjusted maximum luminance value; and generating (415) an output image for the target display by applying a linear mapping to the tone-mapped image, wherein parameters of the linear mapping are based on the minimum display luminance value, the maximum display luminance value, and the adjusted maximum luminance value;

wherein generating the adjusted maximum luminance value ($\mathrm{Tmax}_{Adj}$) comprises computing $$T\max_{Adj} = T\max * \frac{1}{2^{\alpha}},$$

wherein Tmax denotes the maximum display luminance value and α denotes the average picture level boost adjustment parameter;

wherein for an RGB color component in the tone-mapped image applying the linear mapping to generate a color component ($\mathrm{RGB}_0$) in the output image comprises computing $$\mathrm{RGB}_o = \mathrm{RGB} * m - b,$$

wherein $$m = \frac{T\max - T\min}{T\max_{Adj} - T\min}$$

and $$b = \frac{T\min * T\max - T\min^2}{T\max_{Adj} - T\min} - T\min$$

denote the parameters of the linear mapping, Tmin denotes the minimum display luminance value, Tmax denotes the maximum display luminance value, and $\mathrm{Tmax}_{Adj}$ denotes the adjusted maximum luminance value.

11. The method of claim 10, wherein the average picture level boost adjustment parameter is between 0 and 1.

* * * * *